United States Patent [19]
Wilkins

[11] Patent Number: 6,147,306
[45] Date of Patent: Nov. 14, 2000

[54] RANDOM POSITIONABLE WALL CAVITY ELECTRICAL JUNCTION BOX

[76] Inventor: Richard Wilkins, 547 E. Center St., Provo, Utah 84606

[21] Appl. No.: 09/333,275

[22] Filed: Jun. 15, 1999

[51] Int. Cl.[7] .................................................. H01H 13/04
[52] U.S. Cl. .................................................. 174/58
[58] Field of Search .................. 174/58, 57, 53, 174/66; 220/3.8, 241, 3.7; 52/220.7; 33/528, DIG. 10

[56] References Cited

U.S. PATENT DOCUMENTS

| | | | |
|---|---|---|---|
| 2,042,620 | 6/1936 | Noyes | 174/58 X |
| 4,433,204 | 2/1984 | Wuertz | 174/53 X |
| 5,065,968 | 11/1991 | Kesler et al. | 174/58 X |
| 5,804,763 | 9/1998 | Smeenge | 174/58 X |

Primary Examiner—Dean A. Reichard
Attorney, Agent, or Firm—Dennis L. Mangrum

[57] ABSTRACT

A device for securely positioning an electrical junction box in a wall cavity of a building structure, the device having a first portion including; a supporting flange, a riser and a three sided box, stamped or molded as a single member, wherein the supporting flange can be secured to any structural member of the wall to position the electrical junction box in any pre-determined location, the box having a depth equal to the width of the inside of the wall cavity and adapted to receive electrical cables for coupling or connection to an electrical device. A second portion of the device is a face plate for forming the front covering of the electrical box, and adapted to be joined to an electrical device and/or cover plate, the face plate having two extended sides. The extended sides of the face plate when positioned in alignment with the three sided box of the first portion it closes the electrical junction box. The face plate is also adapted to have an electrical device or a cover plate secured thereto. The device enables a laborer to securely install an electrical junction box in any location of a wall cavity regardless of the location of structural wall members.

7 Claims, 5 Drawing Sheets

RANDOM POSITIONABLE WALL CAVITY ELECTRICAL JUNCTION BOX

FIELD OF THE INVENTION

The present invention relates to locating and securing an electrical junction box in a cavity wall of a building. The junction box and bracket are stamped or molded as a single member. A face plate completes the junction box. The bracket and junction box secure the device into any desired position irrespective of the location of structural wall members.

BACKGROUND ART

Current technology for constructing buildings utilizes cavity walls having vertical studs and top and bottom plates. Wall material like sheet rock is fastened to the outside of the studs and top and bottom plates forming a cavity between the front and back wall (sheet rock) panels. Electrical cable, television, and other kinds of wiring are placed in the cavity of the wall prior to the wall (sheet rock) being installed. Wherever an electrical outlet is required, a junction box must be secured in place between the walls. Sometimes junction boxes are located in the wall for joining electrical cables. Standard electrical boxes are well known in the art and have been utilized for many years. Typically the electrical junction boxes are formed from metal or heavy gauge plastic and are located in a wall by being nailed directly to a stud. Knock out panels formed in the sides of the electrical junction box can be utilized, as needed, to allow electrical cables to pass into the junction box, from various directions, to be coupled permitting the installation of switches, plugs, or other electrical devices. Current building code requirements mandates that such electrical junction boxes be secured in place and not be movable. Therefore, almost all prior art devices utilize direct nailing or securing of the electrical junction box to a vertical stud.

There are numerous patents issued that attempt to solve some of the problems encountered in the placing of electrical junction boxes. Many time studs do not appear directly where electrical outlets are required. A typical solution to this problem is the installation of several additional studs and/or blocks to be installed at the time of framing of the wall so that the electrical outlets can be positioned where desired. A common problem with the placing of all electrical junction boxes is to secure them in the wall cavity so they do not move. Movement interferes with their use and could cause electrical failure. Historically the electrical junction boxes were nailed directly to structural members. Some boxes have small brackets which aid in the nailing process and are capable of better securing the box in position. This method restricts placement of boxes on structural members. Often junction boxes need to be positioned were there is no vertical stud or other structural member. Another problem is that most electrical outlets are positioned an equal distance from the floor. Use of the old device required measuring a precise location for each box.

New brackets have been developed that can be fastened to standard electrical junction boxes, to assist in random positioning of junction boxes. One problem inherent in standard electrical junction boxes is that their depth is less than the width of the standard wall cavity. Consequently, any pressure applied to the face of the junction box may push the box into the cavity and make it dangerous and/or non-useable. Standard junction boxes cannot be secured to sheet rock because there is no structural integrity. One solution is described in U.S. Pat. No. 5,098,046 issued to Webb disclosing a mounting bracket to randomly dispose junction boxes. This mounting bracket requires it be coupled to a standard fabricated electrical junction box. Webb and other patents which utilize a bracket all require a standard off-the-shelf electrical junction box. The additional step of coupling the junction box to the mounting bracket is time consuming and costly. However, some of the prior art mounting devices are unstable and not capable of being secured in position. Webb attempts to solve the problem of stabilization by providing a stabilizing arm that helps to restrict the backward movement of the electrical box.

Another patent issued to Lippa as U.S. Pat. No. 5,450,974 discloses the use of standard electrical box having an "L" strap formed as part of the electrical box can be nailed directly to any stud. This device requires a structural member located adjacent to wherever it is places. There are numerous other devices previously patented for helping to secure an electrical box inside the wall cavity of the building structure. All prior art devices utilize standard issued off-the-shelf electrical junction box attached to the bracket. The connection requires an additional step during construction. Some such devices are still unstable when utilized.

Accordingly there is needed a method for locating and securing the electrical junction box in building cavity walls, at any location, without the necessity of having to make special framing provisions. There is also needed a device that can if desired, uniformly position the electrical outlets a standard distance from the floor in a rapid and efficient manner.

SUMMARY OF THE INVENTION

The present invention provides a device that will enable an unskilled laborer to rapidly and securely position an electrical junction box inside a cavity wall during construction. The device is stamped out of sheet metal or formed from injection molded plastic as a single member with a face plate. A single member forms both the bracket and electrical junction box. The bracket is formed to permit rapid and efficient mounting of the junction box inside of any wall cavity at any location without special framing requirements. The bracket can be secured to any stud or base plate or any other structural member so as to locate an electrical junction box. The device has a base flange that is typically screwed or nailed a base plate, but it can be slipped under the base plate without fasteners. A riser extends from the flange to a three sided box (that is preformed as part of the riser). The box has a top, bottom, and back side. The depth of such box is precisely equal to the depth of the cavity of the wall. Knock-outs outs are pre-formed in the top and bottom of the box for allowing communication with electrical cables. The base flange positions the bracket in its location. However, once the structural walls are erected the bracket and junction box will be securely positioned between the two walls. The depth of the box will prevent the box from deflecting or moving with use. In construction the structural members of the walls are first installed and then the electrical boxes are positioned. The face plate can be secured to the front of the electrical junction box. The face plate has two extended sides which complete the enclosure of the junction box. The sides of the face plates also have knockouts capable of receiving the electrical cables. Through out this description the device is referred to as a junction box. It is referred to by numerous names such as outlet box, switch box or electrical box.

The use of the devices described in this invention permit rapid and precise location of any junction boxes anywhere within the cavity of any wall of a structure. The face plate is also adapted to receiving a cover plate and/or other electrical device such as a duplex outlet plug, switch, etc. The uniqueness of this invention is that it can be formed from sheet metal or injection molded from heavy plastic as a single piece and not require the use of an standard electrical junction box. The unique design permits unskilled laborers to install the devices rapidly during construction. Such deployment significantly decreases the time of construction and increases the economics of the construction industry. It also enables more rapid construction because boxes can be located precisely and efficiently.

In an alternate embodiment such a box can have two Risers, one on each side of the junction box each which extend sufficient distance to be secured to a structural member. Such an embodiment adds stability to the device.

In an alternate embodiment the two sides of the front face e plate that forms the side walls of the junction box are slotted so as to be adapted to securely engage the back wall of the junction box.

In another embodiment the riser can be adapted to be able to have varying lengths for spacing the junction box at different heights off of the floor or a different distance from the vertical studs.

DETAILED DESCRIPTION OF THE INVENTION

Drawings:

These and other features, aspects and advantage of the present invention would become better understood with reference to the following description, appended claims and the accompanying drawings where:

DETAILED DESCRIPTION

Figure 1:
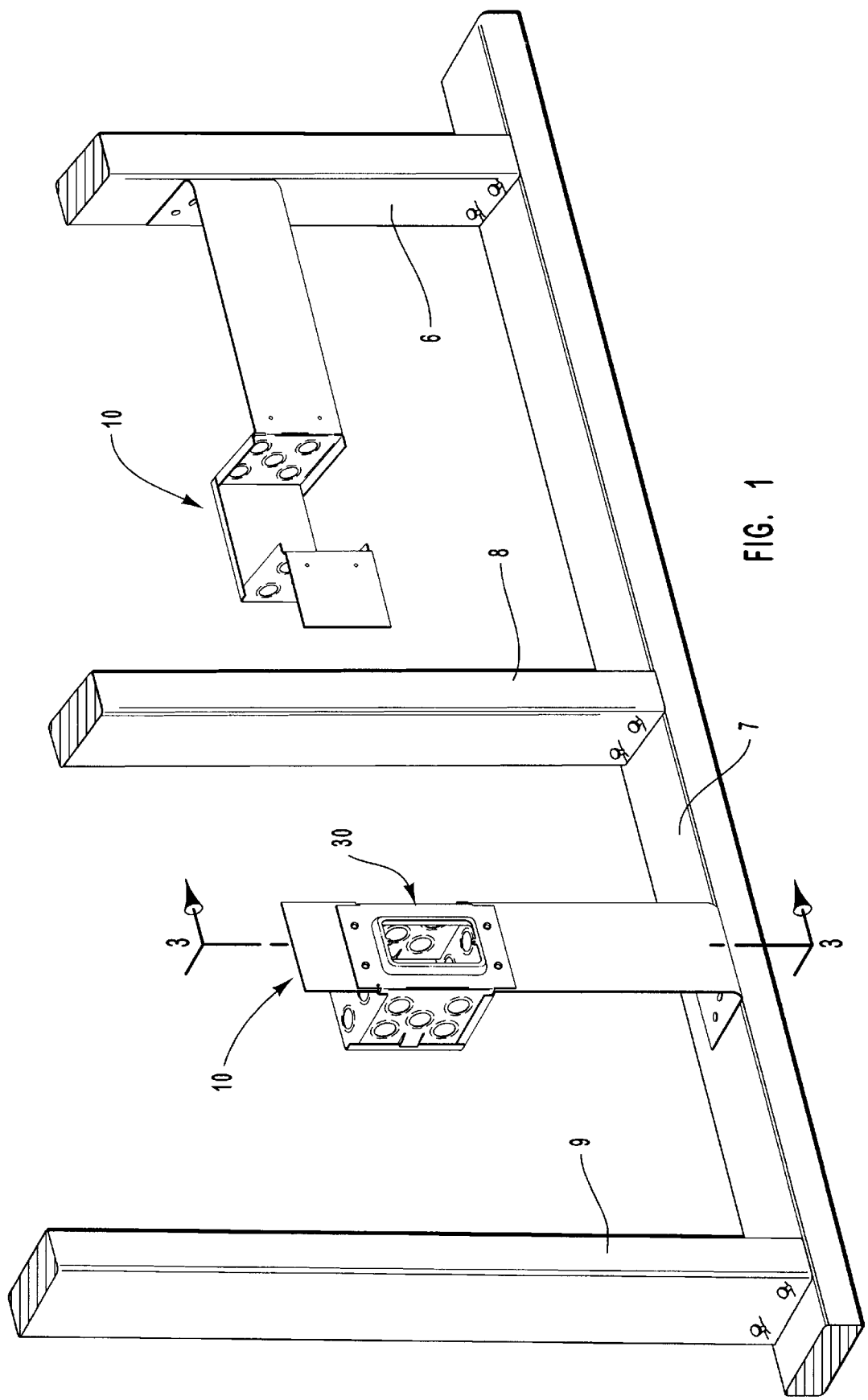
FIG. 1 is a perspective view of the present invention shown enclosed within a standard stud wall.

The device 10 of the present invention is to be used for positioning electrical junction boxes within a cavity wall of a building structure. Structural building walls FIG. 1, usually have a base plate 7 and vertical members, called studs, 6, 8 and 9. The top of such walls usually have a top plate (not shown). The device 10 of the present invention is shown in FIG. 1 disposed inside of the wall cavity 55, FIG. 3, prior to the installation of the wall membrane 50, (usually sheet rock). The wall membranes 50 are not usually structural and can not be used for securing an electrical junction box into position. Referring to FIG. 1 two devices 10 of the present invention are shown. One is secured in position to the base plate 7 and one is secured in position to the vertical stud 6. Only two devices 10 have been depicted in FIG. 1, however, The device 10 is able to be positioned at numerous other locations as required.

Figure 2:
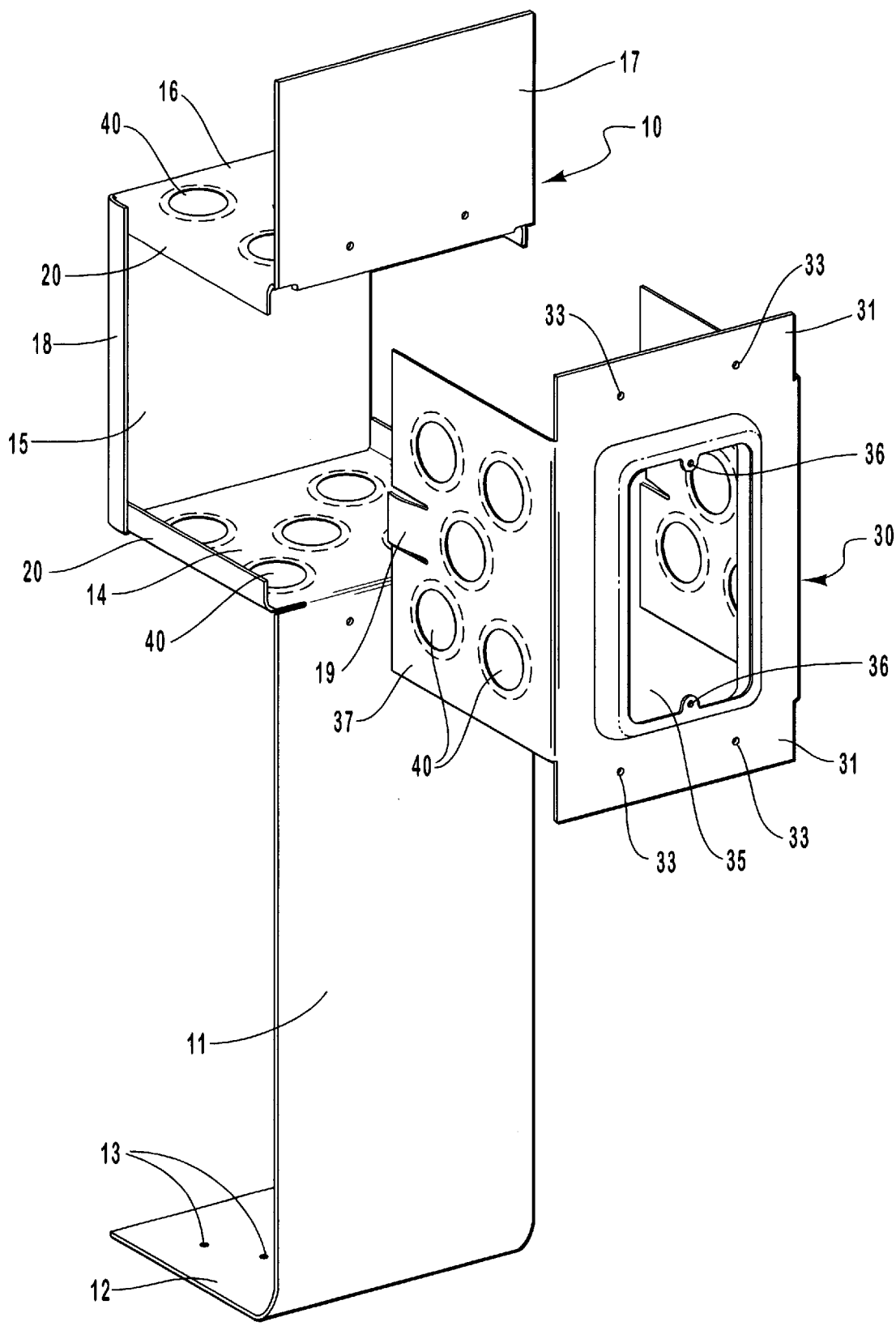
FIG. 2 is a perspective view of the device of the present invention.

With references to FIGS. 1, 2, and 3 the preferred form of the present invention will be described in detail. Referring first to FIG. 2 the device 10 is shown in an expanded perspective view. The device 10 is typically fabricated from stamped sheet metal or injection molded plastic. It has a base flange 12 with at least two holes 13 disposed therein for rapid securement to a structural member of a stud wall. The width of flange 12 is normally about one-half the width of a structural member. The flange 12 can be either screwed or nailed directly to the base plate 7 or some other structural member. Alternately the base flanges can be slid under the base plates without fasteners.

Extending vertically from the flange 12 is a riser 11. The riser 11 can be of any desired length but is typically a length equal to the standard distance of an electrical outlet above the floor of a building. Standard building practice is to center the junction box either 12 inches, 18 inches, or 24 inches from the floor.

Figure 3:
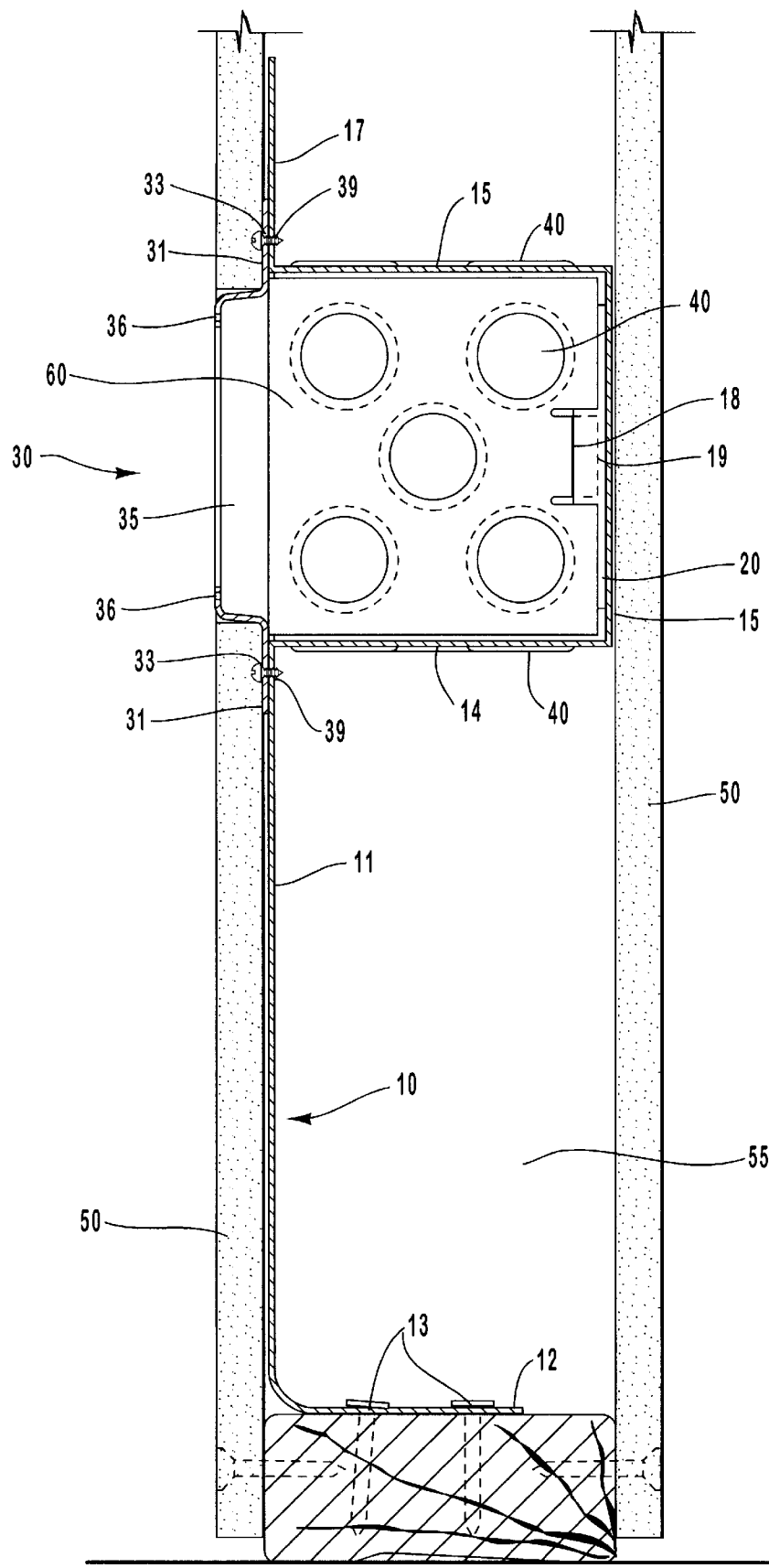
FIG. 3 is a side view of the device shown installed in the standard stud wall.

At the top of the riser (opposite the base Flange 12) 11 is formed a "C" shaped junction box 60, FIG. 2 and FIG. 3. The bottom 14 of junction box 60 is parallel to the base flange 12. The back 15 of junction box 60 is vertical to the bottom 14, while the top 16 is parallel to the bottom 14 and base flange 12. The bottom 14, the back 15, and the top 16 each have wrap around sides 18, FIG. 2, that are bent ninety degrees and extend around corner. Each wrap around side extends about ¼ to ½ of an inch around the corner. The wrap around side of back 15 is adapted to receive mating tab 19 of the face plate (which will be described hereinafter). The top 16 has a flange 17 extending upwards from the base flange 12, in the same plane as the riser 11, and is about 1 inch in length in the preferred form. Flange 17 and riser 11 has tapped holes, FIG. 2, for receiving screws for securing the face plate 30 in position as described hereinafter.

Typically the device 10 is stamped from a single sheet metal or injection molded into a single piece of heavy gauge plastic. The top 16 and the bottom 14 of the junction box 60, in the preferred form has knock-outs 40, FIG. 2, which can be used to receive electrical cables (not shown) there through for connection inside of the junction box 60.

The depth of the junction box 60, or the length of the base 14, can be seen in FIG. 3. Here the depth of box 60 is precisely equal to the depth of the wall cavity 55. In the preferred for the height of the junction box 60 is variable, but typically 3 to 5 inches (the same as a standard electrical junction box). The width of the junction box 60 is also variable but typically 2 to 8 inches. The junction box 60 of the present invention is deeper than the standard electrical junction box. Additionally with two open sides an electrician is provided additional space to install electrical cables (not shown) and install any electrical device (not shown) inside the junction box 60.

Figure 4:
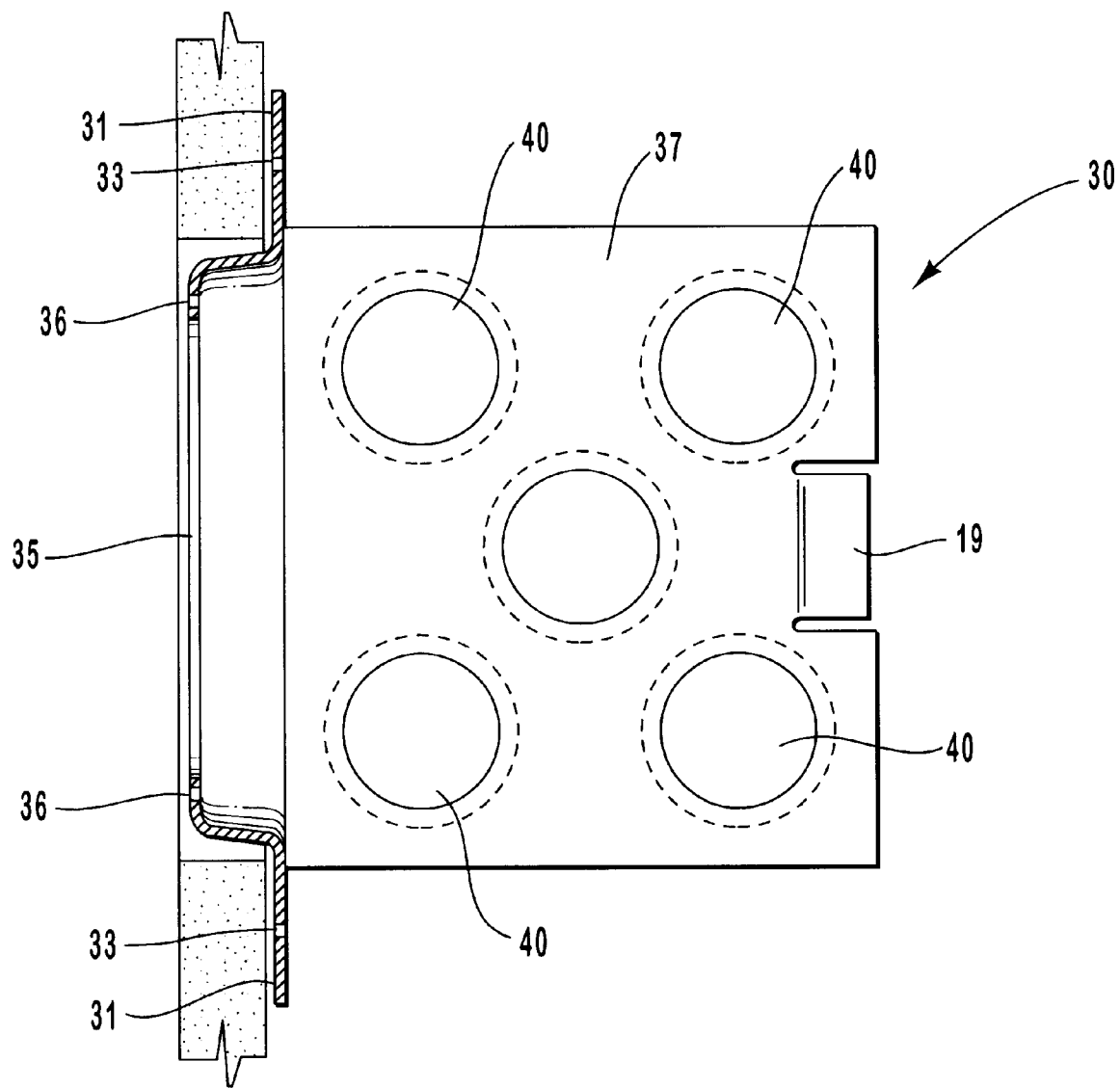
FIG. 4 is a side view of the face plate of the present invention.

Face plate 30 of the present invention is shown in side view FIG. 3 and in an expanded perspective view in FIG. 2. The face plate 30 has a face or front portion 31 and two sides 37. The sides 37 have a length about ¹⁄₁₆ inches less than the depth of the junction box 60 and a width about ⅛ inch less than the height of the box 60. This allows the sides of the face plate 30 to slide inside of the wrap around edges 14, 15, and 16, of the box and the slotted stamped offset tab 19 to engage the wrapped around edges thereby forming a rigid box. The width of the face plate 30 is equal to the inside width of junction box 60. The face plate 30 can be seen in side view in FIG. 4. The face plate 30 normally has a raised ring 35 (often referred to as a mud ring). This provides something to finish to when using sheet rock mud. The face plate 30 has an opening in the front for receiving an electrical device (a switch, plug, etc.) and a covering plate can also be secured to the front to visually finish the electrical outlet. Two holes 39 in the riser 11 are disposed so as to match with the opposite and equal to holes 33 of the face plate 30 and are used for securing the face plate 30 to the upper flange 17 by screws or other fastening means. The sides 37 of the face plate 30 have formed therein knock-outs 40, FIG. 4, for allowing electrical cables (not shown) to pass there through.

In use the face plate 30 can be secured to the upper flange 17 and the riser 11 of the device 10 either before or after the electrical cables (not shown) are installed. If installation is delayed until the electrical cables are installed more space is available for installing the electrical cables.

Having fully described the preferred embodiment of the device 10 of the present invention it's installation and use will now be described. Building structures are typically built having cavity walls. The cavity walls are typically formed using structural members including a base plate 7 and top plate(not shown) mounted to the floor and ceiling respectively. Vertical studs 9, 8, and 6, for example, are disposed between the top plate and base plate 7. A wall covering (usually sheet rock) is then secured to the outside of the studs and base and top plates.

During construction the structural members of walls are installed. The position of each devices 10 is then located in the cavity wall. At each location where a junction box 60 is needed one of the devices 10 is installed. The installation process is very quick. The base flange 12 is positioned so that the face of the riser 11 is in the same plane as the surface of the structural member to which it is being secured. Note that the base flange 12 can be secured by being driven under the structural base plate. The electrical cable is then pulled through the wall as needed and into the junction boxes 60. The electrical cable is then joined in the junction boxes and or joined to an electrical device like a switch or plug which is also disposed within the junction box 60. The face plate 30 is then installed as previously described. The wall membranes are then screwed or fastened by other means to the structural members. Once the device 10 is installed the junction box 60 is held in position by the base flange 12, and by the sheet rock as it presses against the junction box 60 and against the face plate 30.

Figure 5:
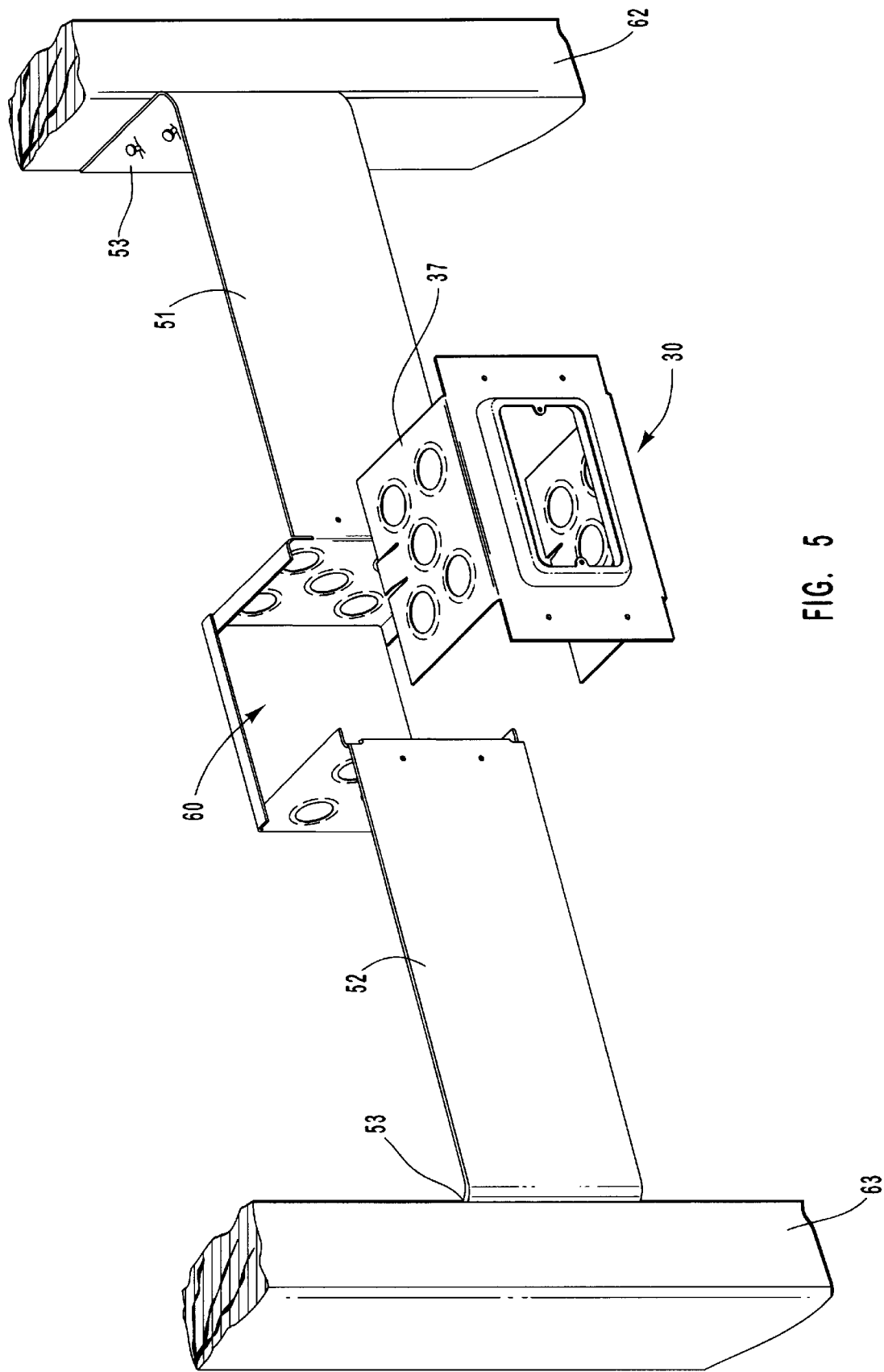
FIG. 5 is a side view of an alternate form of the present invention.

In an alternate embodiment the device 10 may be formed as illustrated in FIG. 5. The risers 51 and 52 have a length sufficient to enable them to extend between vertical studs 62 and 63. Each riser 51 and 52 extend a sufficient distance to communicate directly with the studs 62 and 63 respectively. Flange 53 on both risers can be secured to the studs by screws or otherwise. The junction box 60 of the present invention is formed in exactly the same manner as previously described. The only difference being that the on one end is extended so as to communicate and be coupled with the adjoining stud rather then just being a flange 17.

In an alternate embodiment, when the junction box 60 is used on a floor mounting as shown in FIG. 3, with flexible conduit (not shown) the flange 17 length is increased by about 12 inches and a 90 degree flange of 2 inches. This flange has two notches cut therein which are capable of being fastened to the flexible conduit. This is one way to meet the 1996 National Electrical Code 334-10 which basically states "cables shall be secured within 12 inches of every electrical outlet box."

Although the present invention has been described in considerable detail with regard to certain preferred variations thereof, other versions are possible. Thus, the spirit and scope of the appended claim should not be limited to the description of the preferred version contained herein.

What is claimed is:

1. An electrical junction box for mounting in a wall cavity of a building structure, said wall cavity being defined by a base plate, a top plate, vertical structural members, and a front and rear wall surface, said electrical junction box for receiving electrical cable in said wall cavity comprising:

a base flange coupled to said base plate or to said vertical structural members thereby securing its position within said wall cavity;

a riser extending upward from said base flange;

a partial box having a back and two sides, said partial box, riser and said base flange formed as a single member, said partial box adapted to receive a face plate, said partial box having depth equal to the width of said wall cavity;

a face plate having a front surface and two sides, said two sides couple with said partial box to enclose and define said electrical junction box, said surface of said face plate adapted to receive an electrical device or cover plate;

whereby, said electrical junction box may be mounted at any location within said wall cavity by being coupled to and secured to said base plate, said top plate or said vertical structural members, and said front and rear wall surface, said face plate adapted to be removable to provide access to said electrical cable disposed within said electrical junction box.

2. The device of claim 1 wherein said riser is selectively sized so as to space said electrical junction box a predetermined and uniform distance from said base plate.

3. The device of claim 1 wherein the top and bottom of said electrical junction box have knock-outs formed therein for receiving said electrical cables.

4. The device of claim 1 wherein said face plate has knock-outs formed therein for receiving said electrical cables.

5. The device of claim 1 wherein said partial box, said riser and said base flange are formed of sheet metal and stamped as a single member.

6. The device of claim 1 wherein said face plate is formed of sheet metal and stamped as a single member, for coupling to said partial box and enclosing said electrical junction box.

7. The device of claim 1 wherein each of said partial box, said riser, and said base flange are formed as single member of polyvinyl chloride by injection molding.

* * * * *